United States Patent [19]

Nienhuis et al.

[11] Patent Number: 5,116,235
[45] Date of Patent: May 26, 1992

[54] POWER PANEL STRUCTURE

[75] Inventors: James H. Nienhuis, Wyoming; Jeffrey L. Clark, Holland; Bruce R. Gezon, Caledonia, all of Mich.

[73] Assignee: Herman Miller, Inc., Zeeland, Mich.

[21] Appl. No.: 670,240

[22] Filed: Mar. 15, 1991

Related U.S. Application Data

[63] Continuation-in-part of Ser. No. 585,248, Sep. 9, 1990.

[51] Int. Cl.⁵ .............................................. H01R 4/64
[52] U.S. Cl. .................................. 439/215; 439/211
[58] Field of Search ................................. 174/48, 49; 439/207–215, 120

[56] References Cited

U.S. PATENT DOCUMENTS

| | | |
|---|---|---|
| 3,742,674 | 7/1973 | Lang. |
| 4,360,705 | 11/1982 | Rogers. |
| 4,367,370 | 6/1987 | Wilson et al. |
| 4,713,918 | 12/1987 | Cioffi. |
| 4,762,072 | 8/1988 | Boundy et al. |
| 4,795,355 | 1/1989 | Dorn et al. ............ 439/215 |
| 4,918,886 | 4/1990 | Benoit et al. ............ 174/48 X |

FOREIGN PATENT DOCUMENTS

| | | |
|---|---|---|
| 0174500 | 3/1986 | Fed. Rep. of Germany. |
| 943304 | 3/1949 | France. |
| 2059183A | 4/1981 | United Kingdom. |
| 2155252A | 9/1985 | United Kingdom. |

Primary Examiner—Eugene F. Desmond
Attorney, Agent, or Firm—Varnum, Riddering, Schmidt & Howlett

[57] ABSTRACT

A power panel for use with wall panels of a space-divider system includes a lightweight frame structure having vertically extending end plates and a central web. Front and rear spaces are defined on either side of the web to accommodate electrical and communication wiring and receptacles on both the front and the back of the panel. A rib, extending from the web, divides the front and rear areas and provides physical separation between electrical power and communication wiring. The portion of the web on one side of the rib has an offset curved section to accommodate electrical wiring conduits extending vertically from the top to the bottom of the power panel. The power panel includes an upper area, with a removable cover, above the upper edge of the frame structure to accommodate wiring to and from, and between wall panels adjoining the power panel. A U-shaped cover is removably attached to the lower edge of the frame structure to accommodate wiring to and from, and between, panels adjoining the power panel. Snap-fit removable covers are attached to the front and back of the frame structure. The removable front and back covers and removable upper and lower covers provide easy access to the wiring in the power panel, which accommodates wiring in both the horizontal and vertical direction. The power panel accommodates receptacles on both the front and back in a back-to-back relationship, without increasing the thickness of the power panel beyond that of the standard wall panel, thereby providing an aesthetically pleasing arrangement.

16 Claims, 13 Drawing Sheets

POWER PANEL STRUCTURE

CROSS-REFERENCES TO RELATED APPLICATIONS

This is a continuation-in-part of U.S. patent application Ser. No. 07/585248 filed Sep. 9, 1990 and assigned to the assignee hereof.

BACKGROUND OF THE INVENTION

1. Field of the Invention

The invention relates to work space divider systems employing rearrangeable wall panels and more particularly to power panels for providing electrical power and communications access to work areas defined by wall panels.

2. State of the Prior Art

Space-divider systems employing interconnected rearrangeable wall panels to define work areas are in common use. One advantage of such systems is that open areas may be divided into individual work spaces which may be readily reconfigured by rearrangement of the wall panels to meet the dynamic demands of the work place. A significant problem in such systems, however, is the provision of electrical power and communication connections. The modern work place utilizes many and varied devices such as computer terminals, printers, telephones, telecopiers, computer network connections, etc., which require both electrical and communication connections. In order to allow utilization of such devices, both electrical and communication receptacles are required at various positions in the work spaces created by space-divider wall panels. Changing demands of the workplace often require rearrangement of power and communication outlets and wiring. Hence, ready access to wiring interior to the wall panels is desirable. Furthermore, because of the greater demand for computer ports and electrical power, more connections to the wall panels are required. It is therefore desirable to be able to provide communication access and electrical power-feed connections at a plurality of positions in a space-divider system. Furthermore, it is desirable to provide electrical outlet receptacles at waistline level, above the work surface level, as well as at the baseline of the wall panels, where required. Preferably, electrical and communication receptacles are provided only where needed without modification of standard wall panels in order to avoid production and inventory of a variety of special-function wall panels. Furthermore, receptacles are preferably provided on both sides of the space-divider panels for use in work spaces defined by opposite sides of the panels, and are preferably positioned at like elevations on the front and back of the panels for aesthetic purposes.

Certain prior art space-divider systems have electrical outlets inconveniently located only along the baseline of the wall panels where they are often difficult to reach. In other wall panel systems, the electrical outlets are distributed at various positions in the wall panels. The following are examples of prior art systems.

U.S. Pat. No. 3,823,251 to Heithecker et al., issued Jul. 9, 1974, discloses an interior wall panel which is provided with a plurality of vertically extending hollow channels, formed integral to the wall panel, for receiving electrical wiring. The channels are provided with channel cover securing clips for engaging a channel cover and electrical switch box clips for supporting electrical outlet receptacles and the like at various elevations. One significant disadvantage of the Heithecker arrangement is that special channels have to be formed in the wall panels and covers have to be provided independent of whether electrical outlets or wiring is needed at the location defined by the channels. Another disadvantage of the Heithecker arrangement is that special clips have to be installed in the channels at the location where an electrical outlet is desired and covers of various sizes are required to accommodate receptacles at various elevations.

U.S. Pat. No. 4,349,995 to Dowler et al., issued Sep. 21, 1982, discloses interlocking panels wherein electrical elements and plumbing elements are installed as required for a particular installation. Such an arrangement has the distinct disadvantage of not lending itself to mass production in which all panels are made identical in order to reduce costs.

U.S. Pat. No. 4,685,255 to Kelley, issued Aug. 11, 1987, assigned to the assignee hereof, discloses a work space management system using modular panels provided with electrical wiring channels at waistline and baseline elevations, and convenience outlets disposed at various locations along the horizontally-extending channels. Removable cover panels attach to the frames by means of cover-retaining flanges.

U.S. Pat. No. 3,856,981 to Boundy, issued Dec. 24, 1974, discloses a power panel for use with a space-divider wall panel system containing electrical and telephone wires and receptacles accessible from one side of the panel only. An electrical service box, in which electrical outlets are supported, is provided in the structural framework of the power panel and is formed by means of U-shaped steel channel members in the lower portion of the power panel. The power panel is provided with edge rails for connection to adjacent space-divider panels. One disadvantage of the power panel disclosed in this patent is the relatively expensive power box arrangement and the lack of convenient access to the interior of the panel for wiring purposes.

Accordingly, one problem of prior art systems is that in most systems some customization of basic wall panels is required to provide electrical outlets. A further disadvantage of the prior art systems, generally, is lack of conveniently positioned receptacles on both sides of panels of standard widths and lack of flexibility of positioning of receptacles without modification of the wall panels. A further problem in prior art space-management systems using rearrangeable wall panels is the lack of adequate facilities for extending electrical conduits between baseline service raceways and ceiling-provided electrical power-feed connections.

SUMMARY OF THE INVENTION

These and other problems of the prior art are overcome in accordance with this invention by means of a power panel which may be conveniently incorporated at various locations in a wall panel space-divider system. The power panel comprises a frame structure and front and rear panel covers supported on the structure. The frame structure comprises a pair of vertically extending end plates and a centrally disposed interconnecting web extending between the end plates. Front and rear spatial areas are defined between the web and the front and rear panel covers, respectively, for accommodating electrical outlet receptacles in the front and rear spatial areas. Advantageously, the electrical receptacles may be supported on the frame structure in a back-to-back relationship. The web is further provided with a rib member extending to the panel covers, thereby dividing the front and rear inner spatial areas each into a pair of physically separate inner spatial areas, with electrical outlet receptacles disposed on one side of the rib member and communication receptacles disposed on the other side of the rib member. Advantageously, the power panel in accordance with this invention may be used to provide electrical power and communication connections at various vertical elevations on one or both sides of the power panel without increasing the thickness of the power panel beyond the thickness of a standard wall panel. Furthermore, the rib member advantageously separates electrical supply wiring from the communication wiring. The frame structure is further provided with standard slotted rail and attachment devices for supportive attachment to adjacent wall panels on one or both sides of the power panel. Advantageously, the power panels may be conveniently attached to one or both sides of any wall panel at a position where an electrical or communication receptacle is desirable without modification to the standard wall panels. It is another advantage of the power panel in accordance with this invention that the standard slotted rails may be used for supporting a work surface to form a continuous work surface with adjacent wall panels.

In accordance with one particular aspect of the invention, at least a portion of the web includes an offset section to accommodate one or more vertically extending electrical cables or conduits having an exterior dimension greater than normally available between a centrally disposed web and the outer wall of a wall panel of standard thickness. In one embodiment, the offset section is a curved S-shaped section. Advantageously, the offset web section allows the use of greater diameter conduits within the wall panels to accommodate a larger number of electrical wires in the conduits without increasing the thickness of the power panel and maintaining the pleasing aesthetics of a wall area of uniform thickness. In one embodiment of the invention, the panel covers are provided with designated areas for accommodating communication receptacles and the offset section of the web is provided with openings in alignment with the designated areas to avoid interference with the receptacles.

The interconnecting web in one embodiment of the invention is provided with an opening in register with electrical outlet receptacle openings in the panel covers. A connector assembly disposed in the opening supports an electrical outlet on each side of the web, and is provided with electrical terminals for engaging terminals of electrical outlets. In one particular embodiment of the invention, a Y-shaped connector assembly engages one edge of the web opening and supports a pair of oppositely facing electrical outlets. In another embodiment, a connector assembly comprises a substantially flat portion having two pairs of oppositely directed connectors at one end thereof for supporting two electrical outlets on each side of the web. The flat portion of the connector houses electrical wiring and is provided with resilient locking brackets for retaining electrical outlets in contact with the connectors.

Further, in accordance with this invention, an electrical connecting arrangement for a power panel, having a raceway at one end and electrical outlets disposed in the panel away from the raceway, comprises a conduit disposed in the raceway and having a flat offset section provided with a dual connector at at least one end thereof. The dual connector is provided with a straight portion and an angular portion which extends at an angle from the straight portion. The connector arrangement further comprises a substantially flat conduit disposed in the raceway adjacent one end of the offset conduit and having an angularly extending connector for engagement with the angular portion of the dual connector of the offset conduit. Advantageously, with this arrangement, a conduit extending to outlets outside of the raceway of the power panel may be readily connected to a raceway conduit using standard connecting arrangements.

In accordance with one aspect of the invention, front and rear power panel covers are removably supported on the frame structure by cover-retaining flanges formed integral with the rib member and end plates of the structure. Each cover is provided with flanges and spring clips for engaging the flanges on the end plates and the rib member. A plurality of covers are provided to be used interchangeably for different applications. Each cover has a vertically extending marked section with visually discernable markings to identify the function of a portion, e.g., the electrical power portion, of the power panel. Certain of the covers have openings to accommodate receptacles, and the marked section is discontinuous at the openings. Other covers do not have openings, and the marked section is continuous over the length of these panels. Advantageously, this arrangement provides a cost-effective power panel structure with function-identifying covers which are readily removable to provide a lay-in capability for electrical and communication wiring, both for initial installation and later rearrangement.

The interconnecting web of the frame structure is provided with an enlarged section adjacent the end plates to accommodate fasteners used for the attachment of slotted rails and other attachments to the end plates. The enlarged sections allow fasteners to extend through the end plates and into enlarged sections to assure a secure attachment. By means of the slotted rails and standard connectors, the power panel may be readily attached to adjacent wall panels. In one embodiment of the invention, the outer surface of each of the end plates is provided with a longitudinally extending groove and extending into the enlarged section of the interconnecting web adjacent the end plates. Advantageously, the grooves, in cooperation with the enlarged sections in the web allow attachments to be made at any desired vertical position along the end plates by the use of appropriate self-tapping screws without the necessity for predrilled attachment holes.

Advantageously, the power panel is provided with an upper spatial area for accommodating electrical and/or communication wiring disposed above the frame structure. In one embodiment of the invention, the upper spatial area is defined by a U-shaped support bracket attached to the upper edge of the frame by means of screws extending into the enlarged sections of the web adjacent the end plates. The U-shaped bracket has upwardly extending side walls and a top opening and is provided with cover-engaging flanges for retaining a top cover for covering the upper spatial area. In another embodiment, an upper portion of each of the two end plates, extending above the upper edge of the interconnection web, is provided with a U-shaped opening to accommodate wiring extending along the upper portion of adjacent wall panels or power poles and into or across the power panel.

A lower bracket, provided with cover-engaging spring clips, is attached to the lower edge of the frame by means of screws extending into enlarged sections of the web adjacent the end plates. A generally U-shaped bottom cover, which covers a lower spatial area, below the interconnecting web, for containing electrical and communication wires, is provided with flanges which engage the spring clips of the lower bracket. An electrical junction block may be disposed in the lower spatial area for connection to electrical conduits from adjacent wall panels or power poles, thereby providing an electrical connection between adjacent panels and to electrical outlets in the power panel. The upper and lower spatial areas and vertically extending spatial areas provide a convenient interface with a power pole for the distribution of power and communication wiring.

Advantageously, the arrangement in accordance with this invention provides a flexible, convenient power panel. The frame structure may advantageously be manufactured in a cost-effective manner as an extruded aluminum structure having flanges and protuberances formed integral to the structure.

BRIEF DESCRIPTION OF THE DRAWING

An illustrative embodiment of the invention is described in the following detailed description, with reference to the drawing in which.

DETAILED DESCRIPTION OF THE PREFERRED EMBODIMENT

Figure 1:
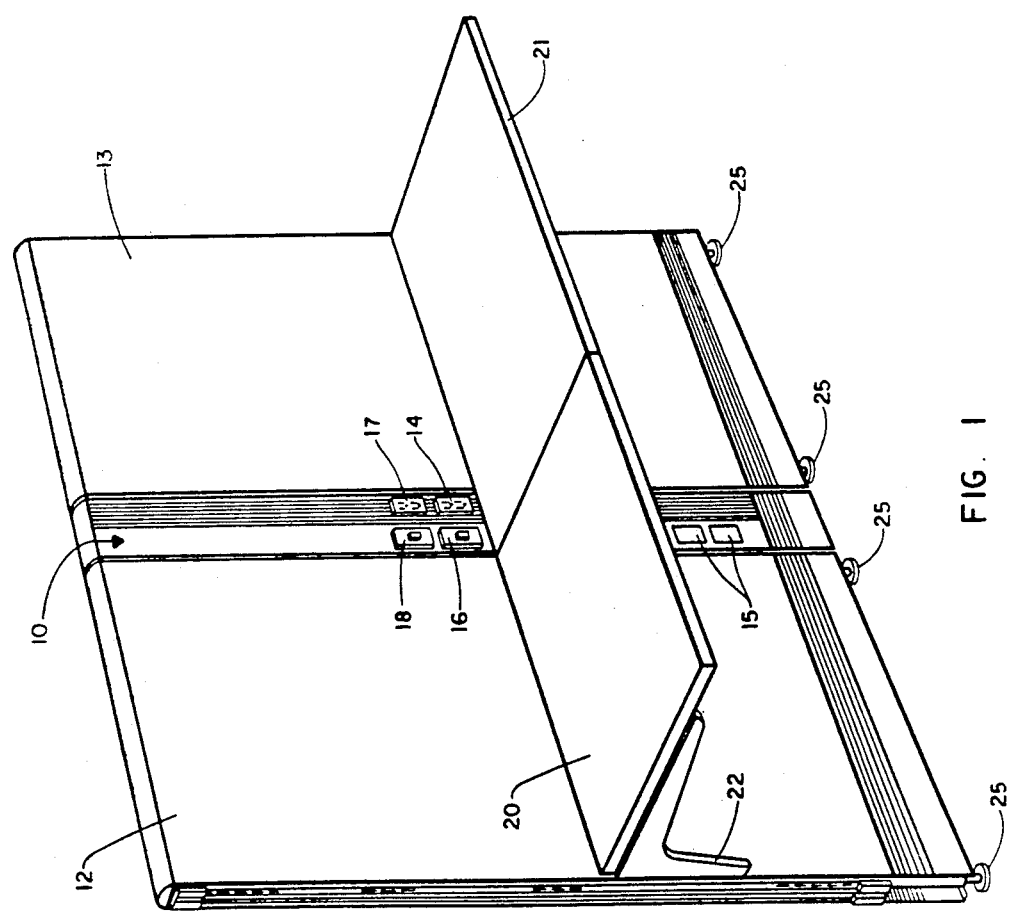
FIG. 1 is a perspective view of a power panel according to the invention disposed between adjacent standard wall panels.

FIG. 1 is a perspective view of an illustrative power panel 10 connected between a pair of freestanding wall panels 12 of a space-divider system. The power panel is of a limited width, e.g., six inches, so that it may be readily integrated into a space-divider wall system in an aesthetically pleasing manner. A power panel may be positioned at one end or both ends of a standard wall panel without modification of the wall panel. The wall panels, which are often in standard sizes, e.g., 36, 42, 48 inches, may be extended by a standard 6-inch-wide power panel to form an overall structure compatible with other system dimensions. The power panel 10 may also be conveniently positioned adjacent a power pole to provide a power pole interface.

Figure 2:
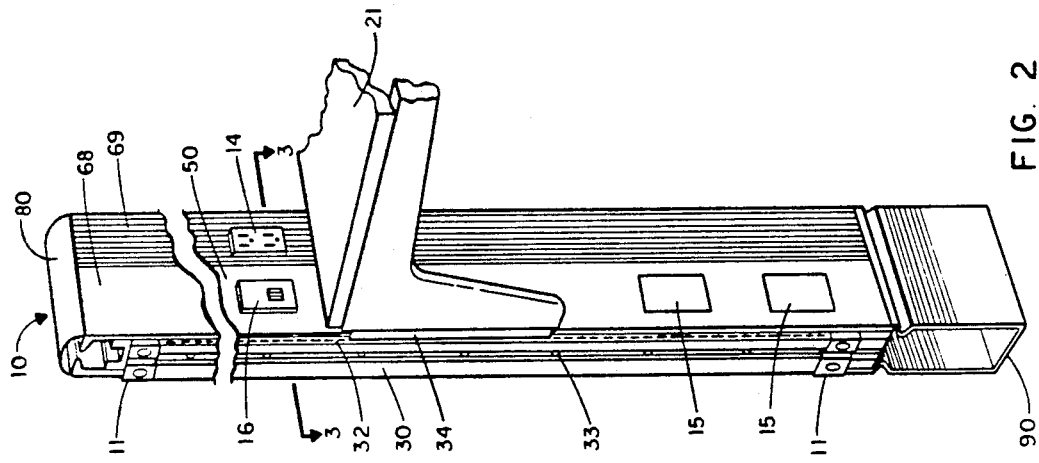
FIG. 2 is a fragmentary perspective view of the power panel of FIG. 1.
Figure 7:
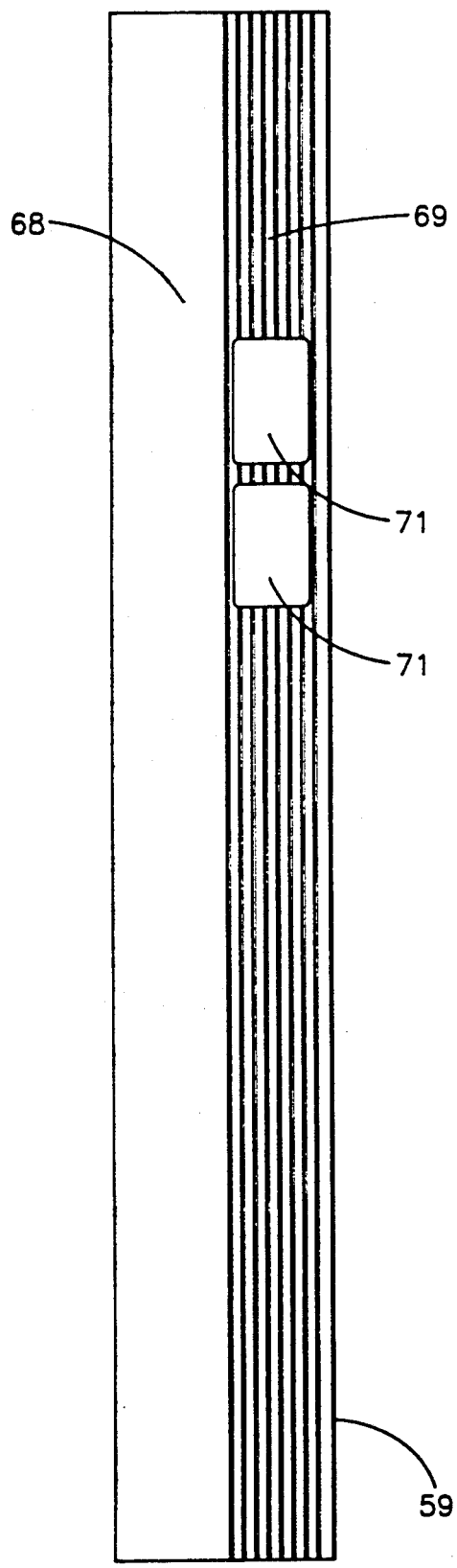
FIGS. 7 and 8 are alternate embodiments of covers for the power panel.
Figure 8:
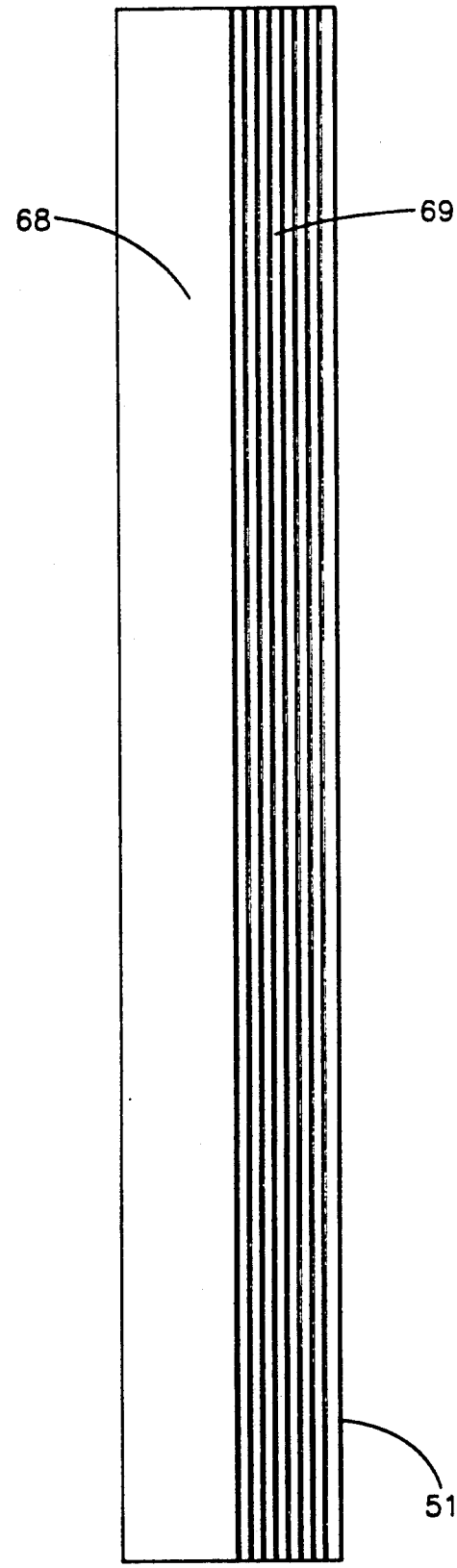

In the embodiment shown in FIGS. 1 and 2, the power panel 10 is provided with a pair of standard duplex electrical outlets 14, 19 and communication outlets 16, 18 on the front surface of the panel and a plurality of knock-out panels 15 are provided in which communication receptacles may be installed at various elevations along the front surface of the panel. A second surface, which is an essentially mirror image of the front surface, is provided on the opposite side of the panel which, for the purposes of this description, is referred to as the rear of the panel. The front and rear covers are removable, and alternate cover configurations are available. One of the sides may not require any outlet, in which case a plain cover, without openings or knock-out panels, is used. Such a panel is shown at 51 in FIG. 8. In another configuration, only electrical outlets may be required. In such a case, a panel such as shown at 59 in FIG. 7, provided with electrical receptacle openings 71, may be used.

The thickness of the power panel 10 is the same as standard wall panels, e.g., approximately two inches, and electrical and communication outlets can be provided on both the front and the rear of the panel in a back-to-back relation. The electrical outlet 14 and communication outlet 16 may be positioned at waistline level above work surface 21. The work surface 21 may be supported on adjacent wall panel 13 at one end and on power panel 10 at the other end and is aligned with work surface 20 supported on the other adjacent wall panel 12. The work surfaces are attached to the panels in a standard fashion such as by means of bracket 22 visible in the perspective view of FIG. 1. Wall panels 12 are supported at their lower ends by means of standard support legs 25. The power panel and the adjacent wall panels are each provided with standard slotted rails and the power panel may be connected to adjacent wall panels in a standard fashion by means of conventional wedge blocks and draw block connectors which connect the panels together. An example of a suitable panel-to-panel connector is disclosed in the U.S. patent to Propst et al., U.S. Pat. No. 3,517,467, issued Jun. 30, 1970, which is incorporated herein by reference.

FIG. 2 is a perspective view of the power panel 10, showing slotted rails 30 having a plurality of slots 32, and wedge blocks 11, used to connect the power panel 10 to adjacent wall panels. The slotted rails 30 are fastened to an internal frame structure of the power panel by means of standard fasteners 33. Work surface 21 is attached to slotted rails 30 in a standard fashion by means of brackets 34 having hooks which engage selected ones of the slots 32.

Figure 3:
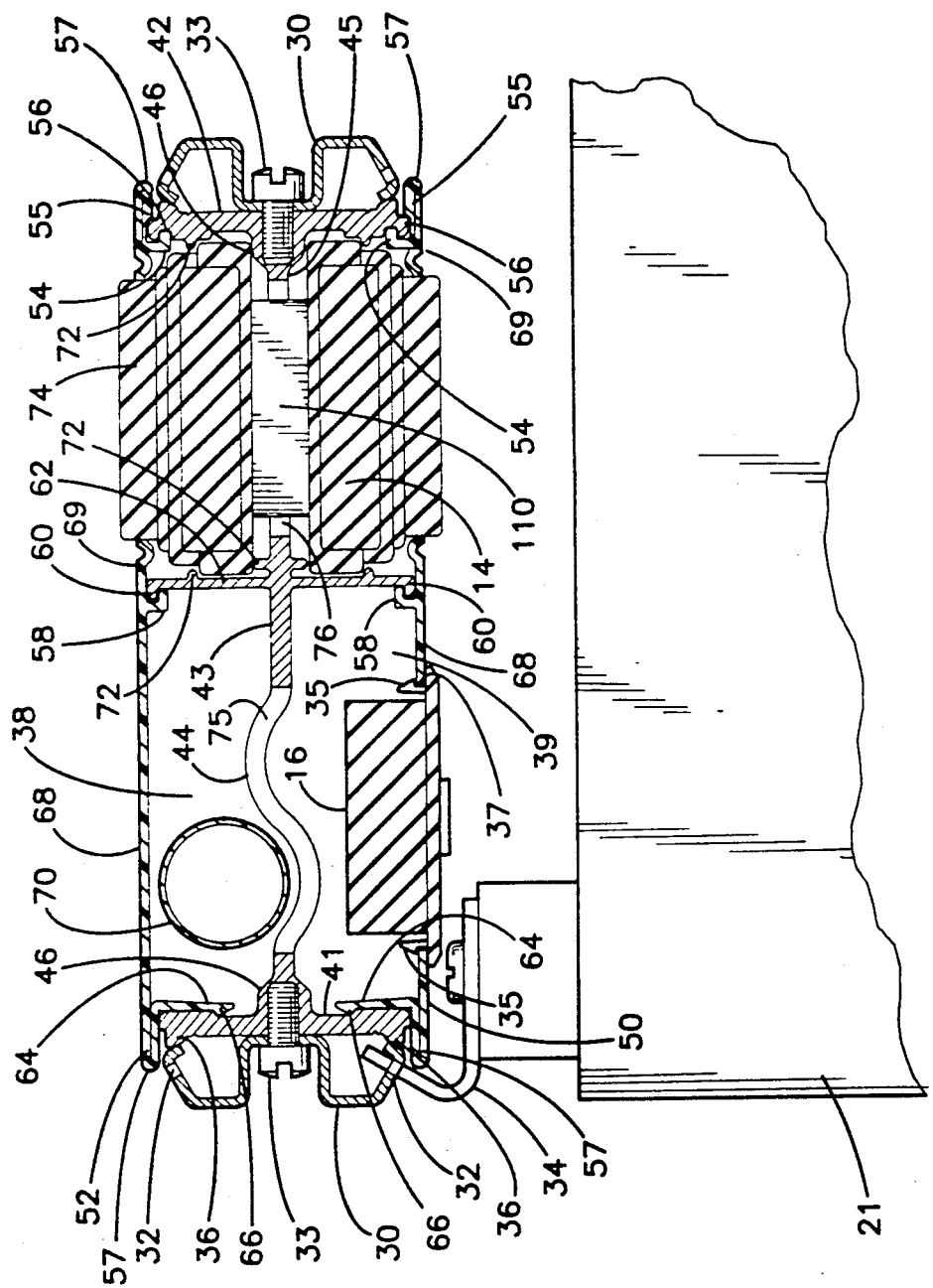
FIG. 3 is a cross-sectional view of the power panel along line 3—3 of FIG. 2.

A cross section of the power panel 10 is shown in FIG. 3, showing the substantially I-beam-shaped internal frame structure, including end plates 41 and 42 and a centrally disposed, interconnecting web 43 provided with enlarged sections 46. The slotted rails 30 are attached to the I-beam frame structure by means of attachment screws 33 extending through end plates 41, 42 and into enlarged sections 46 of the web 43.

Referring further to FIGS. 2 and 3, the power panel 10 is provided with a removable front cover 50 and a removable rear cover 52. The covers are each provided with flanges 54 engaging flanges 56 of end plate 42. As shown in FIG. 3, flanges 58 engage flanges 60 on a centrally positioned rib member 62 integral to web 43. Flanges 58 are not essential and may be deleted. Flanges 60 may also be used to retain a power pole extension 63 as shown in phantom in FIG. 15. Power pole extension 63 may be used to extend cabling from a ceiling area (not shown) to power panel 10. Slots 61 in side panels 65 of the power pole extension may engage flanges 60 of rib 62. Covers 50 and 52 are further provided with spring clips 64 engaging flanges 66 of end plate 41 to facilitate removal of the covers. Alternatively, instead of flanges 54 and 58, spring clips may also be used to accomplish the attaching function. As will be apparent from the drawing, web 43 forms front and rear inner spatial areas with front cover 50 and rear cover 52, respectively. Furthermore, rib member 62 further divides the front and rear spatial areas into two physically separate spatial areas, providing physical separation between electrical and communication wiring for safety purposes and to reduce electrical radiation interference. The removable panels 50, 52 provide a lay-in capability by providing ready access to the spatial areas for installation and receptacle rearrangement.

Covers 50 and 52 are each provided with a section 68 having an unmarked outer surface and a marked section 69 having a grooved surface. The unmarked smooth surface and the marked grooved surface are for symbolic purposes. The smooth surface 68 identifies the spatial areas designated for communication wiring and receptacles, and the grooved surface identifies the spatial areas designated for electrical power wiring and receptacles. The same smooth and grooved surfaces 68 and 69 are incorporated in covers 59 and 51, shown in FIGS. 7 and 8, respectively. Cover 59 has adjacent continuous smooth and grooved surfaces, while on cover 51, the grooved surface is shown to be discontinuous at opening 71. In a similar manner, the surfaces of cover 50 are discontinuous at receptacles 14 and 16 and at knock-out panels 15. Covers not provided with knock-out panels may be readily adapted to accommodate communication receptacles at desired locations by cutting an opening in the cover.

The spatial areas 38 and 39, shown in FIG. 3 and covered by the smooth sections 68, can also be used to accommodate a vertically extending feeder cable or wiring conduit 70 adjacent an offset, S-shaped, curved section 44 of the web 43. The section 44 is curved to an extent sufficient to accommodate feeder cables or conduits of greater diameter without expanding the thickness of the power panel beyond that of adjacent wall panels. The same advantage may be obtained by a rectangular-shaped offset or the like, instead of the Sshaped, curved section shown in the drawing. FIG. 3 shows a single conduit 70 in spatial area 38 on one side of the curved section 44. A second conduit or cable can be readily accommodated in spatial area 39 on the opposite side of the curved section 44. When a spatial area, i.e., 38, 39, is not occupied by a conduit, communication receptacles can be accommodated. Cover section 68 covering spatial area 39 is provided with an opening 37 to accommodate communication receptacle 16. Curved section 44 of web 43 is provided with openings 75 in register with opening 37 and each of the knock-out panels 15. Since communication receptacles are used for a variety of purposes and may have nonstandard dimensions, the openings 75 are provided in the web 43 to allow for receptacles which need a space greater than that provided between the web 43 and panels 50 and 52. A variety of different communication receptacles may be accommodated in opening 37 by the use of various standard communication receptacle adapters. The covers, e.g., 50, 52, may be covered by a decorative material as desired. To facilitate application of such material, the covers, e.g., 50, 52, may initially be extruded with straight ends which are subsequently folded over to form folded edges 57.

End plate 42, the straight portion 45 of web 43, and rib 62 are each provided with vertically extending protuberances 72 for engagement with the housing of the electrical receptacles 14 and 74. The protuberances prevent horizontal movement of the receptacles 14, 74 during insertion and removal of electrical plugs, while allowing movement in the vertical direction for removal and installation. A spring clip or the like may additionally be provided for retaining the receptacles 14 and 74.

FIG. 3 shows a communication receptacle 16 extending through an opening 37 in cover 68. A communication receptacle such as receptacle 16 may extend into the opening 75 if necessary. The receptacle 16 is supported in the opening 37 by means of spring clips 35. Electrical receptacles 14 and 74 are both connected to a raceway 110 supported in an opening 76 in the straight portion 45 of web 43. The raceway 110, described further herein with respect to FIG. 9 and 10, serves to support receptacles 14 and 74 in a vertical direction and to provide electrical power to the receptacles. The raceway 110 is provided with a plurality of wires and terminals representing different electrical circuits. For example, in one embodiment, the connector is provided with eight electrical wires and terminals. Four of these are phase terminals, two are neutral terminals, and two are ground terminals such as a common ground and an isolated ground, for various electrical applications. The various circuit combinations provided by the connector are available by the use of an outlet receptacle having the appropriate terminal arrangement for engagement with the raceway 110.

Figure 4:
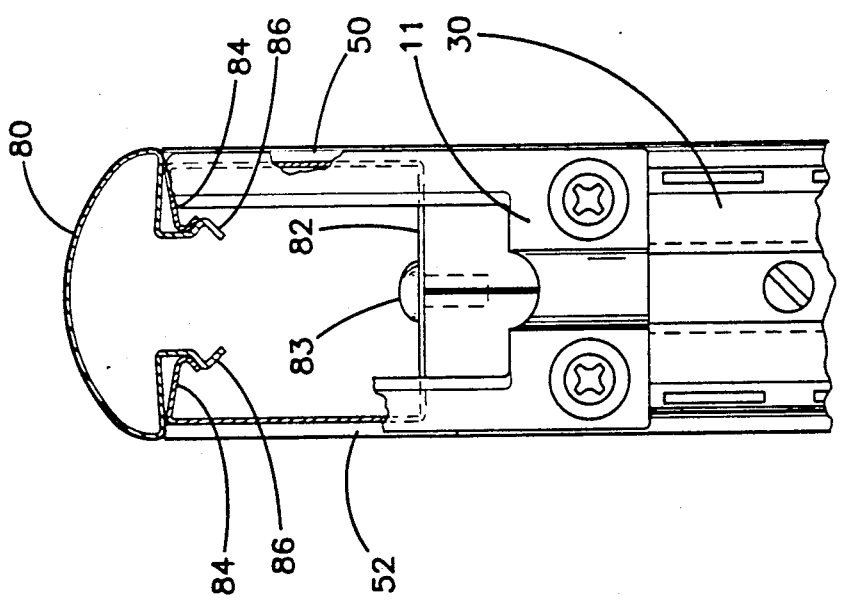
FIG. 4 is an enlarged fragmentary left side elevation of the upper portion of the power panel of FIG. 2.
Figure 6:
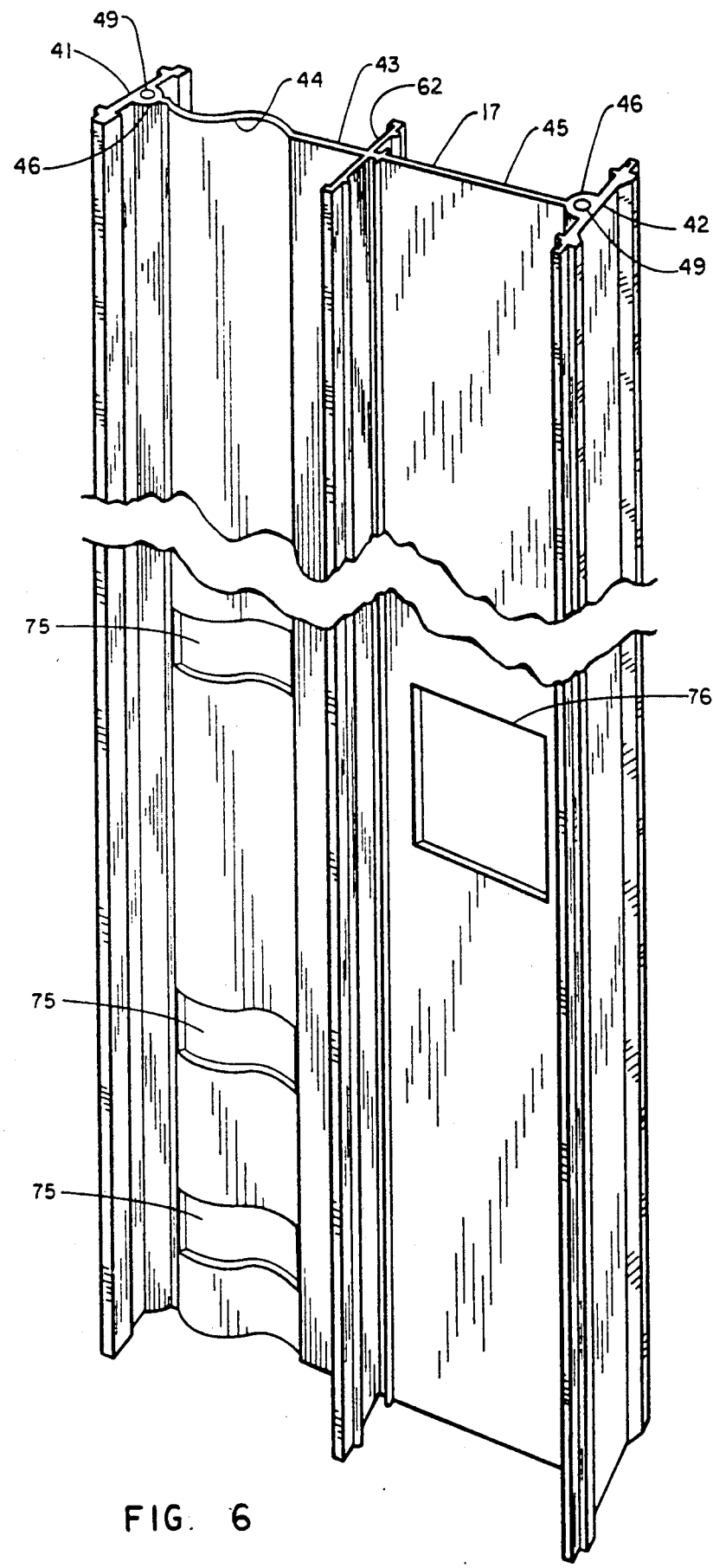
FIG. 6 is a fragmentary perspective view of the frame structure of the power panel of FIG. 2.

FIG. 4 is an enlarged fragmentary left side elevation of the upper portion of the power panel 10, which is provided with an upper cap 80 having spring clips 86 engaging flanges 84. Flanges 84 are integral to a U-shaped metallic bracket 82 which is fastened by means of fasteners 83 to the top of the internal frame structure of power panel 10. FIG. 6 shows the frame structure 17 in perspective view including holes 49 in enlarged sections 46 of web 43. The holes 49 are provided for engagement with fasteners 83. The U-shaped bracket and cap 80 together form a chase for containing electrical wiring extending across the top of the power panel 10 and from panel to panel.

Figure 11:
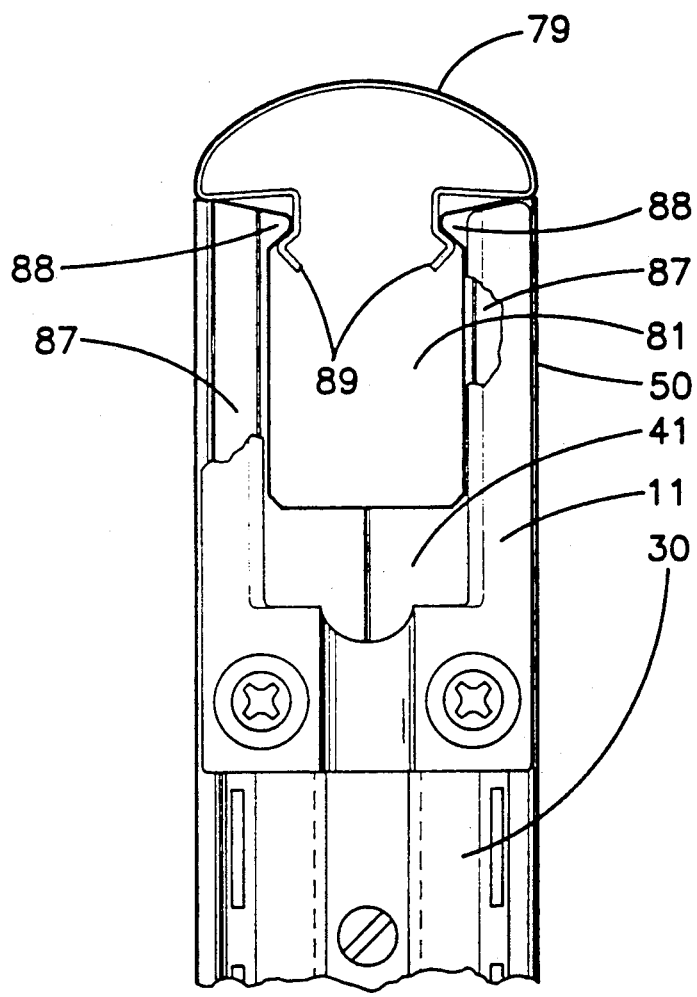
FIG. 11 is an enlarged fragmentary left side elevation of an alternate embodiment of the upper portion of the power panel of FIG. 2.

FIG. 11 shows an alternate embodiment of the upper portion of the power panel 10. In this embodiment, the side portions of end plates 41 and 42 are extended beyond the top edge of interconnecting web 43, and a U-shaped opening is defined above the upper edge of the interconnecting web to accommodate electrical wiring. FIG. 11 shows a left side elevation of the upper portion of end plate 41 with extension sections 87 defining an U-shaped opening 81 therebetween. A cap 79 covers the spatial area defined by the U-shaped opening. Spring clips 89 engage flanges 88 of extensions 87 to retain the cap 79 in place. The spatial area defined by the U-shaped metallic bracket 82 or by extensions of end plates 41, 42 provides a raceway for electrical and communication wiring which may be connected to receptacles in the power panel, may extend horizontally to an adjacent panel, or may extend vertically to a lower raceway area. A power pole may be attached adjacent the power panel in a fashion similar to a wall panel, and electrical power may be provided through the spatial area along the upper edge of the power panel. Similarly, wiring may be provided to the upper edge of the power panel from a power pole extending from a ceiling connection to the top of the power panel. Other configurations may be envisioned in which a power pole may extend along the front or rear sides of the power panel.

Figure 5:
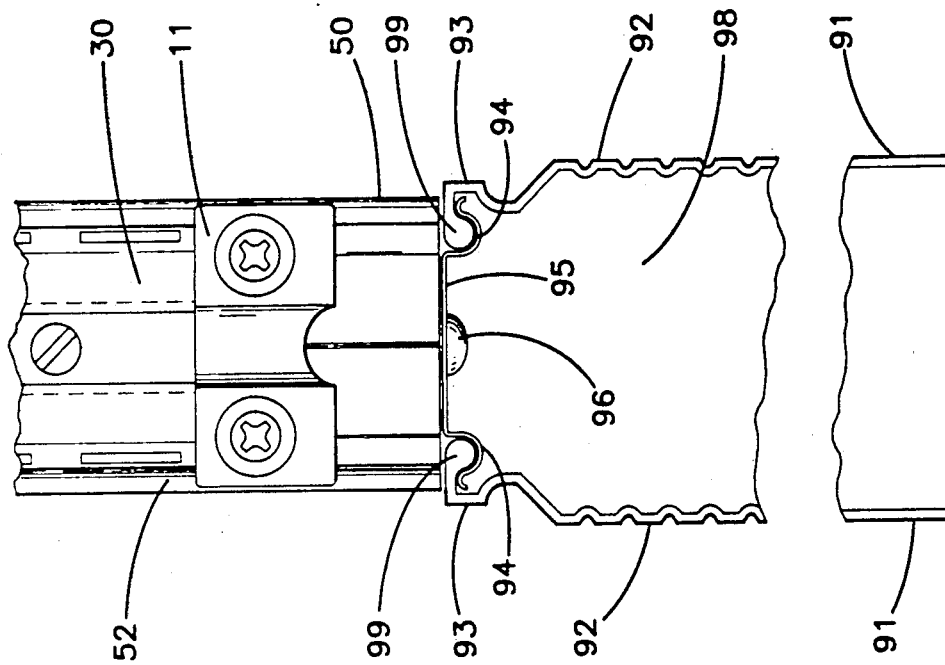
FIG. 5 is an enlarged fragmentary left side elevation of the lower portion of the power panel of FIG. 2.

FIG. 5 is an enlarged fragmentary left side elevation of the lower portion of power panel 10. The power panel is provided with a lower cover 90 having sections 91 provided with a smooth outside surface, and sections 92 provided with grooved surfaces for decorative purposes. The cover 90 is provided with flanges 93 having thickened inwardly-extending edges 99 which are removably engaged and received by spring clips 94. Spring clips 94 are integral to a metal plate 95 which is attached to the frame structure 17 by means of fasteners 96. The fasteners 96 extend into hole sin the bottom of the structure 17 (not shown in the drawing) in enlarged sections 46 of web 43, and generally in alignment with holes 49 shown in FIG. 6. Electrical and communication wiring from wall panels adjacent to power panel 10 can be conveniently extended between the wall panels through the raceways formed by the spatial area defined above and below the frame structure of power panel 10. Receptacles in power panel 10 can be selectively connected to wiring from either of these raceways. Ceiling-provided feeder cables may be brought down to the lower raceway, and floor-provided feeder cables may be brought up to the upper raceway via power panel 10 in the area adjacent the curved section 44 of web 43, as described earlier herein. Feeder cables may also be extended in one of the two electrical power spatial areas when no electrical outlet receptacle is installed therein.

Figure 9:
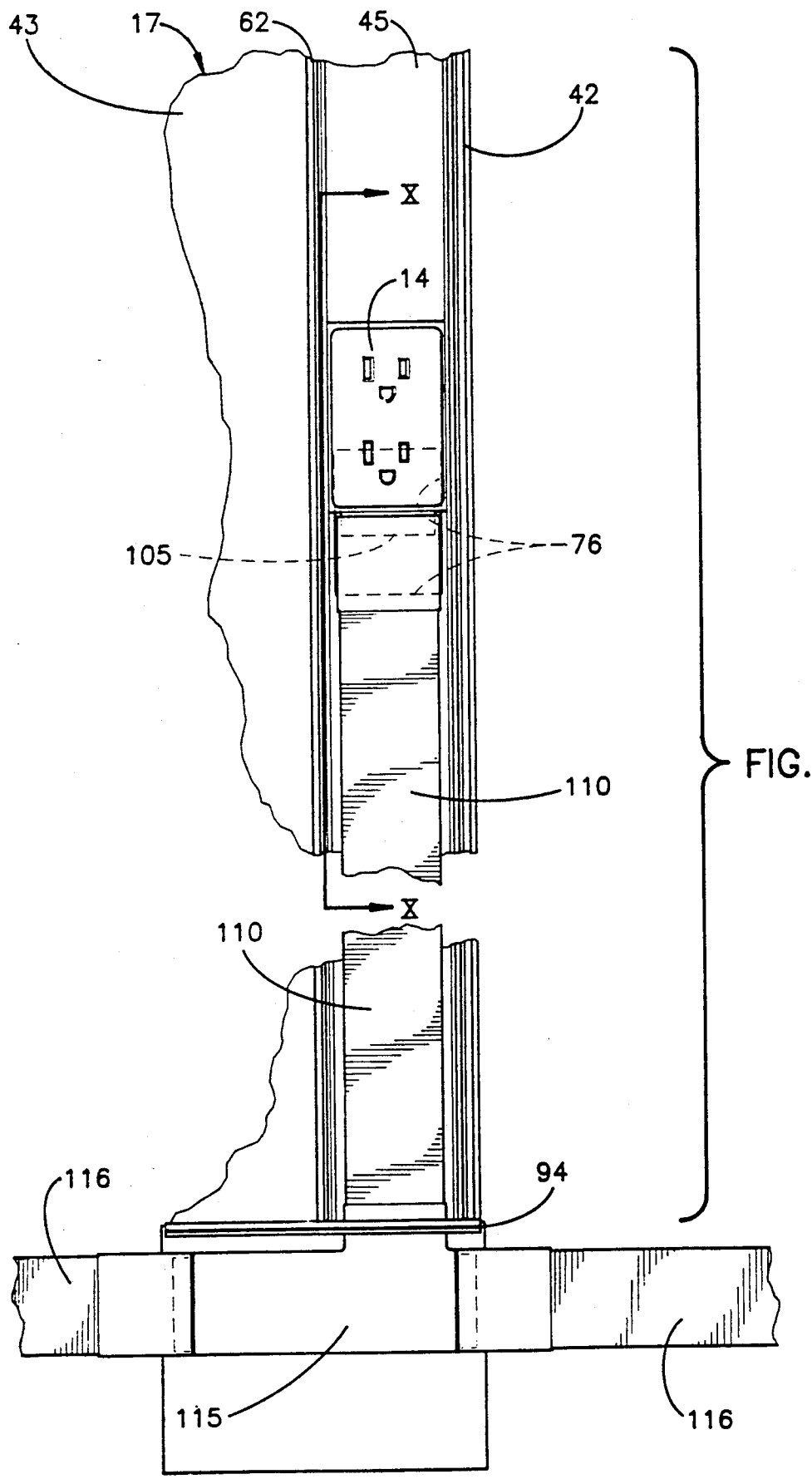
FIG. 9 is a fragmentary frontal view showing electrical connectors in the power panel.

FIG. 9 is a fragmentary frontal view of the frame structure 17 without its front cover and lower raceway cover. FIG. 9 shows a receptacle 14 disposed between central rib 62 and end plate 42. As discussed earlier, protuberances on the rib 62 and end plate 42 prevent horizontal movement of the receptacle 14. The receptacle 14 and the corresponding receptacle 74 on the opposite side of the power panel are supported in the vertical direction on a rectangularly-shaped metallic raceway 110 supported in opening 76 in section 45 of the interconnecting web 43. Raceway 110 has an electrical connector formed integral thereto for engagement with an extension member 105 of receptacle 14. In this manner, electrical connection is established between wiring in raceway 110 and receptacle 14. Raceway 110 extends from receptacle 14 down to the lower portion of power panel 10 to a horizontally extending section 115 which is an integral part of the raceway 110. Section 115 interfaces with raceways 116 from adjacent panels in a standard fashion and provides a through connection between raceways 116 as well as connection to receptacles 14 and 74. As discussed earlier, raceway 110 may be provided with a plurality of terminals representing several different circuit combinations, and different circuit configurations may be obtained by selecting a proper terminal configuration for the receptacles. The raceways 116 may be rigid rectangular raceways or extendable cables or conduits to facilitate extension from adjacent panels to power panel 10. Similarly, section 115 may be provided with extendable end portions to facilitate extension into adjacent panels. Such extendable cables or conduits are well known and may be a commercially available extendable, flexible conduit or a festoon cable provided with sufficient slack to allow the cable to be extended the required distance.

An alternative arrangement uses a "pigtail" or flexible conduit to connect receptacles 14 and 74 to an adjacent panel. Such a connection is advantageous, for example, when no through connection between adjacent panels is required.

Figure 10:
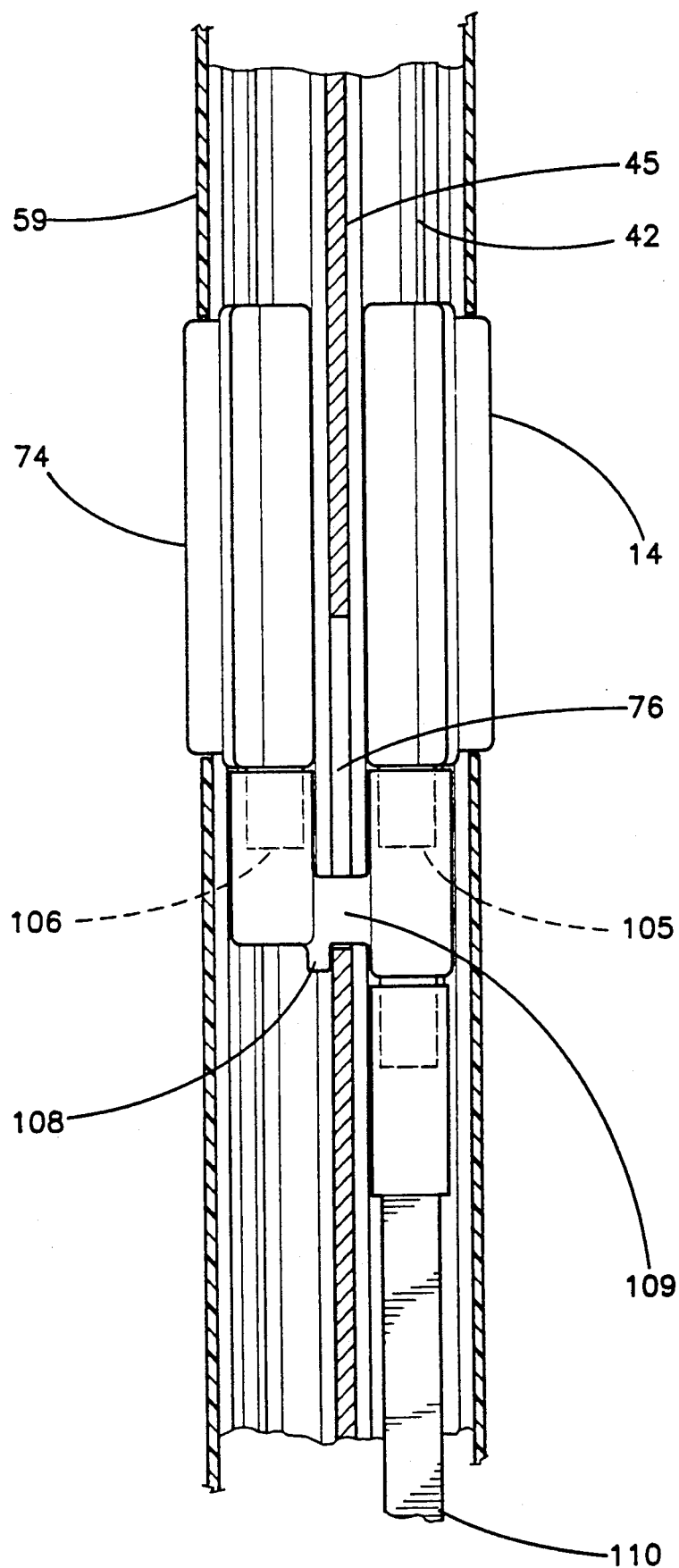
FIG. 10 is a sectional view along line X—X of FIG. 9.

FIG. 10 is a sectional view along line X—X of FIG. 9. FIG. 10 shows two receptacles 14 and 74 disposed in a back-to-back relation and supported by raceway 110. Receptacle 74 is provided with an extension member 106, corresponding to extension member 105 of receptacle 14, extending into raceway 110. Raceway 110 comprises an integral crossover section 109 supported in opening 76. A flange portion 108 of raceway 110 extends below the lower edge of opening 76 and serves as a retainer for raceway 110. In this manner, a single raceway 110 provides electrical connection to two separate receptacles disposed in a back-to-back relation on opposite sides of the section 45 of 43. A similar structure may be used even when the receptacles are not aligned in a back-to-back relationship.

Figure 12:
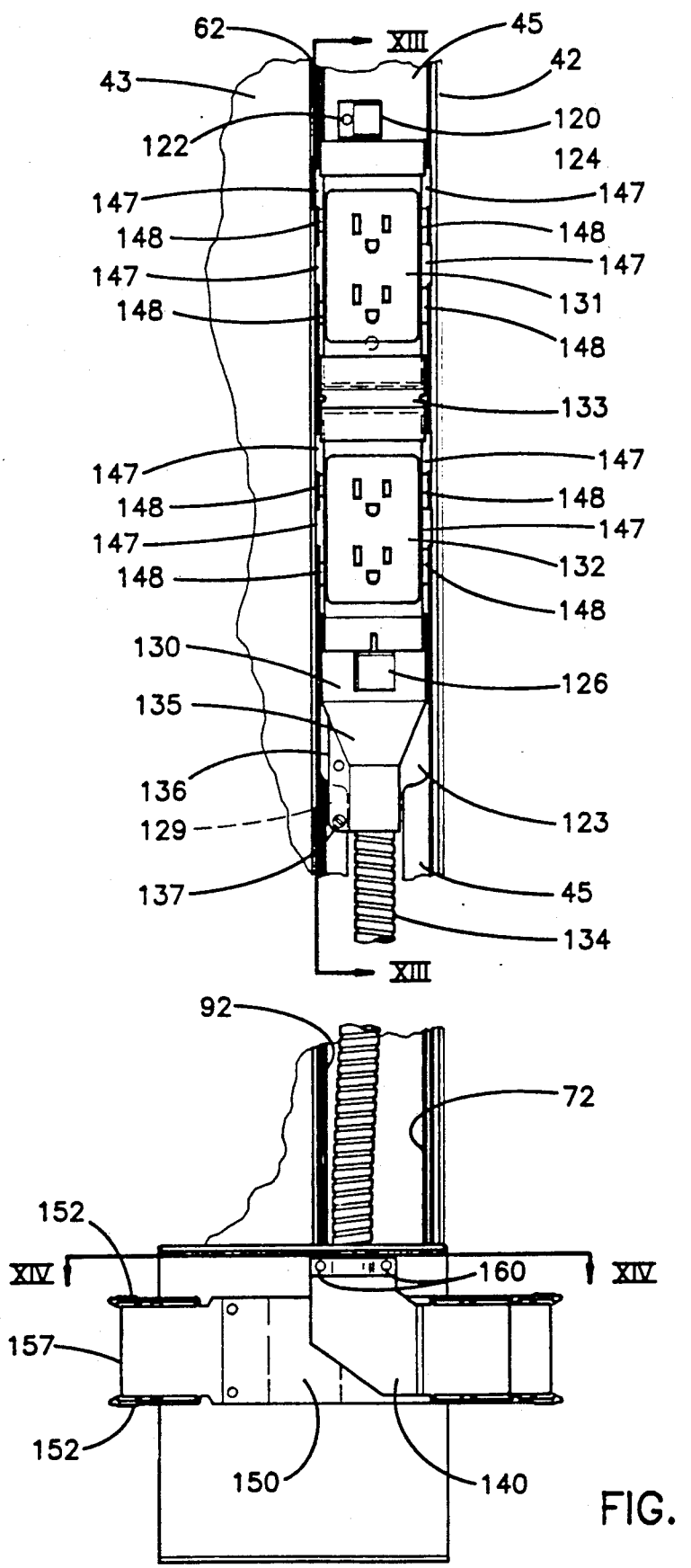
FIG. 12 is a fragmentary frontal view showing an alternate arrangement of electrical receptacles in the power panel.
Figure 13:
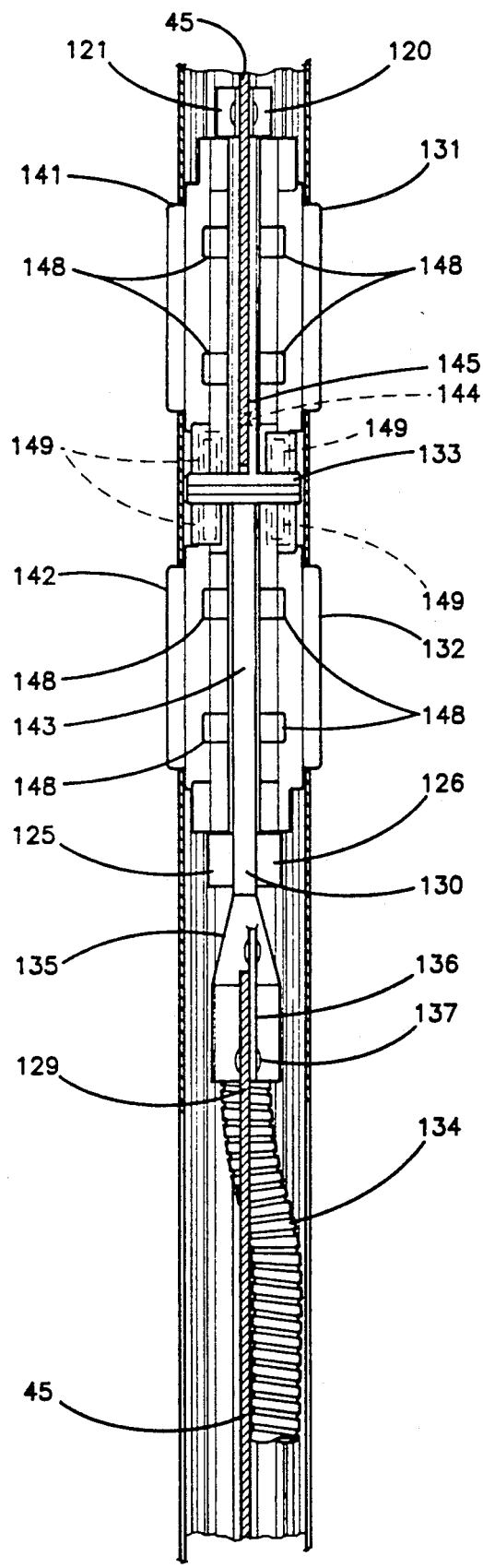
FIG. 13 is a sectional view along line XIII—XIII of FIG. 12.
Figure 16:
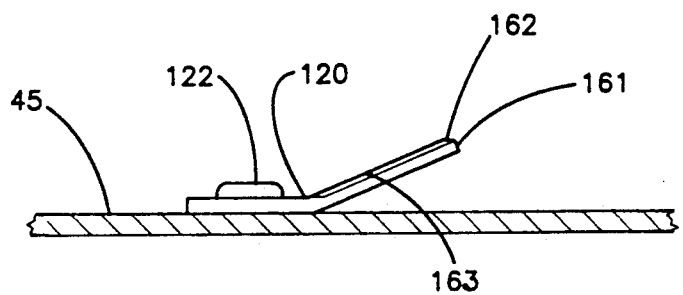
FIG. 16 is an enlarged elevational view of a receptacle latch.

FIG. 12 shows a fragmentary frontal view of a power panel with a pair of receptacles 131, 132 supported on a distribution harness 130 which is supported in an opening 123 in section 45 of the frame interconnecting web 43. FIG. 13 is a cross-sectional view along line XIII—XIII of FIG. 12. As is apparent from FIG. 13, the distribution harness 130 is a dual-sided harness for supporting two electrical outlet receptacles on each side of the power panel. The outlet receptacles may be conveniently located above a work surface such as the work surface 21 shown in FIG. 1, to accommodate additional electrical power cords at the work table level. As shown in FIG. 13, the harness 130 is provided with electrical interconnections section 133 incorporating electrical connector terminals 149 for supplying electrical power to outlet receptacles 131, 132, 141 and 142. The distribution harness 130 is provided with a substantially flat housing section 143 provided with an inner spatial area for electrical conductors extending from the terminals 149 to a conduit connector 135 to which a flexible conduit 134 is connected. Electrical wiring is fed from the bottom of the panel through conduit 134, connector 135 and housing 143 to the terminals 149. The harness 130 is provided with an extension section 145 which is fastened to web section 45 by means of a fastener 144. The fastener may for example be a flat head or counter-sunk rivet to avoid interference with receptacles 131, 141. The conduit connector 135 is provided with a flange 136. A fastener 137 extends through flange 136 into a rib section 129 of the web section 45. In this manner, the harness 130 is firmly secured to the rib section 45 by means of fasteners 137 and 144. The outlet receptacles 131, 132, 141 and 142 are provided with side tabs 148 which are dimensioned to allow entry of a receptacle in the area between end plate 42 and central rib member 62 adjacent to the web section 45 via recessed openings 147 in extruded protuberances 72 in the end plate 42 and the central rib member 62. Upon entry of the receptacle into the position between the center rib member and the end plate in a position in which the tabs 148 are in alignment with recessed openings 147, the receptacle may be moved by sliding movement toward the electrical connector section 133 for engagement with terminals 149. Latches 120, 121 are provided to prevent unintentional movement of receptacles 131 and 141, respectively, away from the connector section 133. Construction of latches 120, 121 is shown by way of example in side elevation in FIG. 16. When a receptacle is positioned such that the tabs 148 are in alignment with opening 147, the back surface of the receptacle will force a resilient portion 161 t o a flattened position adjacent web section 45. When the receptacle is moved to a position where it is in full engagement with connectors of connector section 133 the resilient portion 161 of the latch will be restored to a raised position as depicted in FIG. 16 to retain the receptacle in the desired position. The latch may be provided with beveled front and side edges 162, 163 to facilitate sliding motion of the receptacle over the resilient portion 161. The latch may be made of a resilient plastic material or metal and may be fastened to the web section 45 by means of a rivet or other appropriate fastener 122. Similar latches 125, 126 are provided adjacent receptacles 142, 132 respectively. The latches 125, 126 may be constructed in a manner similar to latch 120 but may be formed integral with the housing section 143 of the harness 130 and maybe made of a plastic material. Alternatively, latches 125, 126 may be substantially identical to latch 120 and fastened to the harness 130 by a rivet or other appropriate fastener.

Figure 14:
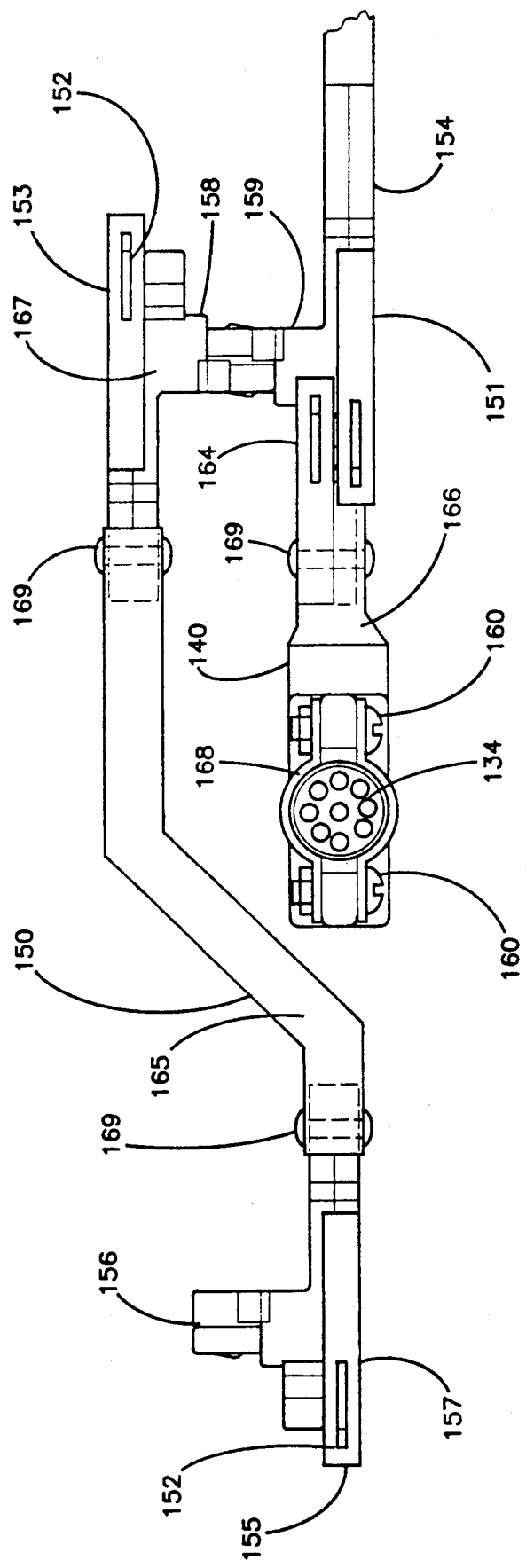
FIG. 14 is a sectional view along line XIV—XIV of FIG. 12.

Further shown in FIG. 12 is the lower portion of the power panel 10 with a raceway area extending below the bottom of the power panel frame structure. The conduit 134 extends from the conduit connector 135 to a raceway connector 140. The connector 140 is adjoined with a pass-through conduit 150 which is provided with connectors for connection to conduits of adjacent wall or power panels. A unique feature of the pass-through conduit 150 is that it includes a housing section 165 which is offset to accommodate the raceway connector 140, shown in FIG. 14, which is a cross section along line XIV—XIV of FIG. 12. The pass-through conduit 150 is provided with a connector 157 having a straight connector section 155 and a right-angle connector section 156 for making an electrical connection to a similar connector of an adjacent panel in a standard fashion. Snap fasteners 152 are provided for engagement with a connector from the adjacent panel. Connector 157 is commercially available, for example, from Pent Incorporated of Kendallville, Ind. The opposite end of pass-through conduit 150 is provided with a similar connector 167 having a straight connector section 153 equipped with snap fasteners 152 and a right-angle connector section 158. The raceway connector 140 is provided with connector 164. A connector 154 from an adjacent panel has a straight connector section 151 for connection to connector 164 of raceway connector 140. A right-angle section 159 of adjacent panel connector 154 engages right-angle connector section 158 of pass-through conduit 150. By using straight and right-angle connector sections, the pass-through conduit 150 and the raceway connector 140 may be readily interconnected with an adjacent panel connector and electrical power radially provided at any desired position within the power panel via cable 134 connected to raceway connector 140. The connector 140 is provided with a housing 166 having an inner spatial area for accommodating wires of the cable 134 which is attached to the housing 166 by means of a cable clamp 168 mounted on the housing 166 and appropriate fasteners 160. Fasteners for attaching connector devices to raceway connector 140 and pass-through conduit 150 are shown at 169. These may be rivets or other appropriate fasteners. Alternatively, the connector devices may be formed integral with the conduit 150 or connector 140.

Figure 15:
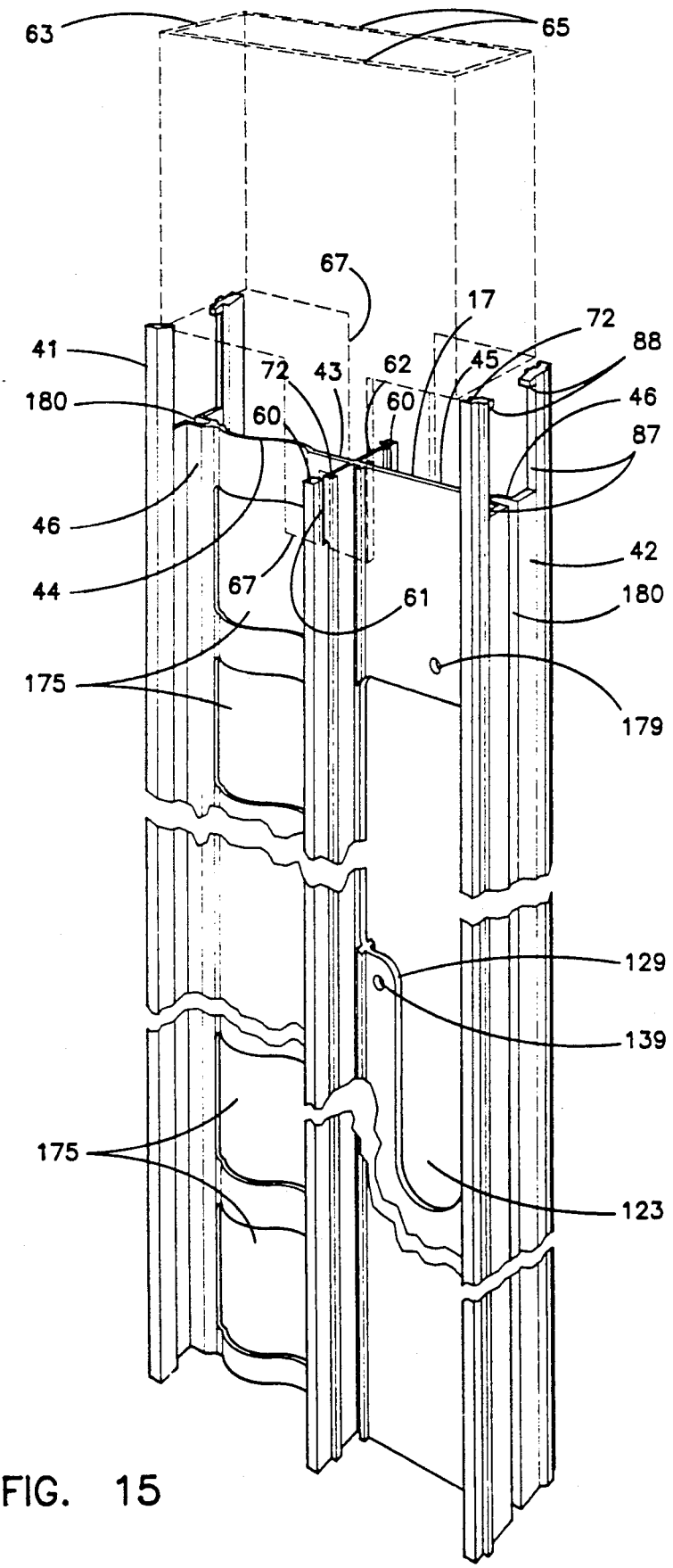
FIG. 15 is a fragmentary perspective view of an alternate configuration of the frame structure of the power panel of FIG. 2.

FIG. 15 is a fragmentary perspective view of the frame structure 17 with an enlarged opening 123 in web section 45 to accommodate the harness 130. Shown in FIG. 15 is the rib section 129 provided with an opening 139 to accommodate fastener 137 shown in FIG. 13. A further opening 179 accommodates fastener 144 by which the extension section 145 of the harness 130 is attached to web section 45. The opening 123 accommodates the harness 130 which is adapted to support two electrical outlet receptacles 131, 132, and 141, 142, one above the other, on each side of the web section 45, and above the work surface 21. Similarly, a pair of communications receptacles may be desired on each side of the power panel above the work surface 21. To that end, an additional opening 175 has been provided in section 44 of the central web 43. A power pole extension 63 is shown in phantom and may be used as a cover for cabling extending from a ceiling area (not shown). Sides 65 of extension 63 are provided with mounting tabs 67 having slots 61 which provide for engagement with flanges 60.

As a further improvement in the frame structure 17, the end plates 41, 42 are each provided with a longitudinally extending groove 180. The grooves extend inwardly into the end plates and terminate in the enlarged sections 46. The groove advantageously allows devices such as the slotted rails 30 (FIG. 2) to be attached at any desired elevational position along the end plates by means of self-tapping screws. The groove 180 is readily added to the end plates during the extrusion process by which the frame structure maybe manufactured. The continuous grooves avoids the necessity for pre-drilled holes at various locations to meet the requirements of different devices to be attached to the end plates. Where needed, a self-tapping screw may also be inserted from the top or bottom of the end plates where the groove terminates in the vertical direction.

Figure 17:
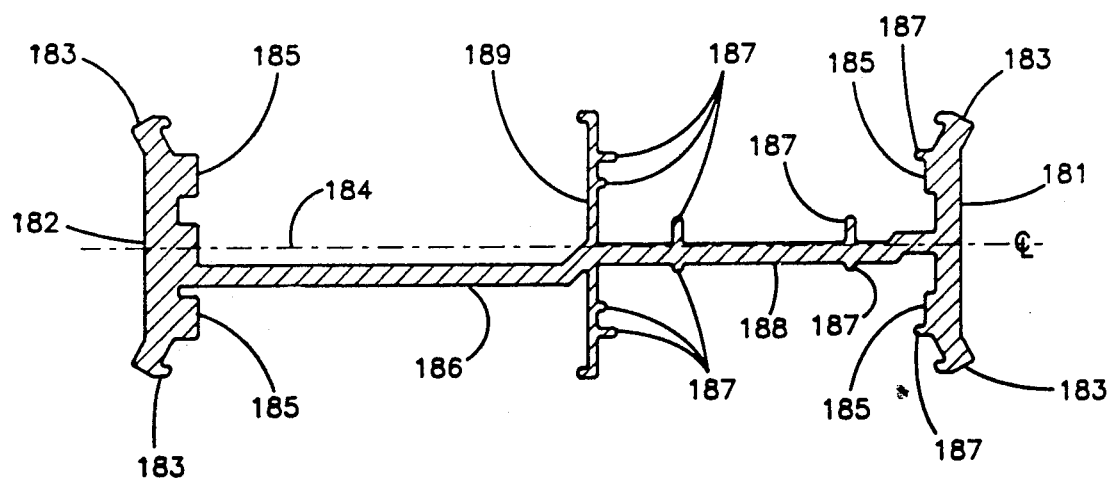
FIG. 17 shows an alternate construction of the power panel frame structure in cross-sectional view.

FIG. 17 shows an alternate construction of a power panel in accordance with this invention, in cross-sectional view. In this configuration, the power panel comprises end plates 181, 182 and interconnecting web sections 186, 188 offset from a centerline plane 184 extending between and including vertical centerlines of the end plates 181, 182. The web section 186 is offset from the centerline plane by a distance sufficient to accommodate conduits, such as conduit 70 of FIG. 3 in a side-by-side relation. This avoids the need for a curved section as depicted in FIG. 3. Web section 186 maybe provided with openings to accommodate communications receptacles, as described earlier herein. Web section 188 is also offset from the centerline plane 184, but to a lesser degree than section 186. The offset is specially provided to accommodate flexible conduits such as conduit 134 shown in FIG. 13 in the area between the web and a panel extending along the outer sides of the frame, as depicted in FIG. 3. The end plates 181, 182 are provided with flange members 183 for engaging front and rear panels. Enlarged sections 185 are provided to accommodate mounting screws for mounting well-known wedge blocks or other attachment arrangements. A rib member 189 extends essentially parallel to the end plates 181, 182. Protuberances 187 are provided on the one side of the rib member 189 and end plates 181 to position electrical outlet receptacles in the spatial areas defined by the web section 188, end plate 181 and rib member 189.

The invention thus provided a panel through which electrical and communication wiring can be carried from the top to the bottom thereof, and by which electrical and communication wiring can be accessed at one or both sides thereof at convenient locations. The snap-fit removable covers provide easy access to the wiring. Furthermore, there is an integral separation of communication and power wiring within the panel. The framework is structural in nature and formed by an extruded shape which needs little fabrication to be complete for installation. The power panel is relatively light, cost effective, functional and aesthetically pleasing.

It will be understood that the above-described embodiments are only illustrative of the invention and that numerous other configurations can be devised by those skilled in the art without departing from the spirit and scope of the invention.

What is claimed is:

1. A power panel arrangement for use in a space-divider wall panel system, comprising:
    a frame structure;
    a frontal face cover and a rear face cover supported on said frame structure;
    said frame structure comprising first and second vertically extending end plates and a web interconnecting said end plates and extending in a generally vertical direction, said frame structure defining front and rear spatial areas between said web and said front and rear covers for accommodating forwardly-facing and rearwardly-facing electrical outlet receptacles in said spatial areas;
    a pair of electrical outlet receptacles blocks mounted in at least one of said spatial areas, each of said electrical outlet blocks comprising a frontal wall and at least one electrical receptacle in said frontal wall; and
    at least one opening in one of said covers in register with said outlet receptacle blocks to provide access thereto.

2. The arrangement in accordance with claim 1 wherein said web comprises an opening and said arrangement further comprises an electrical connector extending into said opening and having at least two sets of connector terminals, each set engaging one of said pair of receptacle blocks in said at least one of said spatial areas.

3. The arrangement in accordance with claim 2 and further comprising a pair of said electrical outlet receptacle blocks mounted in another of said spatial areas and wherein said connector further comprises additional sets of terminals, each of said additional sets of terminals engaging one of said pair of receptacles mounted in said other spatial area.

4. A power panel arrangement for use in a space-divider wall panel system, comprising:
    a frame structure;
    a frontal face cover and a rear face cover supported on said frame structure;
    said frame structure comprising first and second vertically extending end plates and a web interconnecting said end plates and extending in a generally vertical direction, said frame structure defining front and rear spatial areas between said web and said front and rear covers for accommodating forwardly-facing and rearwardly-facing electrical outlet receptacles in said spatial areas;
    a pair of electrical outlet receptacles mounted in at least one of said spatial areas; and
    an electrical connector having at least two sets of connector terminals, each set engaging a receptacle of said pair of receptacles;
    said connector comprising a housing having an electrical terminal section including said at least two sets of terminals, two of said sets extending in opposite directions for engagement with a pair of receptacles disposed on opposite sides of said terminal section.

5. The arrangement in accordance with claim 4 wherein said terminal section comprises sets of terminals directed in opposite directions in both said front and rear spatial areas.

6. The arrangement in accordance with claim 4 wherein said connector housing has an end edge and said electrical terminal section is positioned in the proximity of said end edge and wherein at least one receptacle extends beyond said one end edge when in engagement with one of said sets of terminals and wherein said web comprises a receptacle retaining latch for retaining a receptacle in engagement with said one set of terminals.

7. The arrangement in accordance with claim 6 wherein said latch comprises a first section mounted on said web and a second section hingedly attached to said first section along a line extending substantially parallel to a longitudinal centerline of said web, said second section assuming a flattened position when a receptacle is being inserted for engagement with said one set of terminals and assuming a raised position, preventing removal of said receptacle, when said receptacle is in complete engagement with said one set of terminals.

8. The arrangement in accordance with claim 4 and further comprising a cable attachment connector engaging one end of said housing and a substantially flat housing section extending between said one end and said connector section for retaining electrical wiring.

9. The arrangement in accordance with claim 8 wherein said housing section comprises substantially flat, oppositely facing outer walls for supporting oppositely facing receptacles on opposite sides of said housing section.

10. The arrangement in accordance with claim 9 wherein said housing section comprises a latch device on at least one of said flat outer walls to maintain a receptacle in a specified position relative to said connector section.

11. The arrangement in accordance with claim 8 wherein said opening has one edge having a flanged side area and said cable attachment connector has a flange for engagement with said flanged side area to maintain said connector housing in a predetermined position relative to said one edge.

12. The arrangement in accordance with claim 11 wherein said opening has another end edge and said connector assembly has an extension member extending in a direction away from said one end of said housing, said extension being offset from a longitudinal centerline of said housing section for engaging said web in an area adjacent said other edge of said opening.

13. A power panel arrangement for use in a space-divider wall panel system, comprising:
   a frame structure;
   a frontal face cover and a rear face cover supported on said frame structure;
   said frame structure comprising first and second vertically extending end plates having inner surfaces and a web interconnecting said end plates and extending a generally vertical direction, said frame structure defining front and rear spatial areas between said web and said front and rear covers for accommodating forwardly-facing and rearwardly-facing electrical outlet receptacles in said spatial areas; and
   a pair of electrical outlet receptacles mounted in at least one of said spatial areas;
   said frame structure further comprising vertically extending rib members extending from said web to said covers, said rib members having surfaces opposite said inner surfaces of said end plates, said inner surfaces and said rib members having protuberances for retaining electrical outlet receptacles between said inner surfaces and said rib members, said receptacles comprising positioning tabs external thereto and said protuberances comprising recessed openings for allowing entry of said tabs in spatial areas defined by said web, said rib members, said inner surfaces and said protuberances.

14. A power panel arrangement for use in a space-divider wall panel system comprising:
   an electrical cable extending from a main raceway in said power panel to an electrical receptacle positioned in said power panel and away from said raceway;
   a main raceway through-connect for connection to connectors of adjacent panels, said through-connect comprising an offset member having a first section at one end of said through-connect having a connector for connection to a first adjacent panel, and a second section offset from said first section; and
   an angle connector having a first section having one end connected to said cable and a second section extending in a direction at a prescribed angle to said first section of said angle connector and disposed substantially in parallel alignment with said first section of said through-connect;
   said second section of said through-connect and said second section of said angle connector each having a connector for connection to another adjacent panel.

15. A power panel arrangement for use in a space-divider wall panel system, comprising:
   a frame structure;
   a pair of oppositely facing panel covers supported on said frame structure;
   said frame structure comprising first and second vertically extending end plates and a web interconnecting said end plates and extending in a generally vertical direction to define separate inner spatial areas between said web and said panel covers;
   generally vertically extending rib members extending from said web toward said panel covers, thereby dividing each of said separate inner spatial areas into a pair of separate areas;
   an opening in a portion of said central web extending between said rib member san done of said end plates; and
   a connector assembly supported in said opening for supporting at least one electrical receptacle on each side of said web in the vicinity of said opening;
   said end plates having vertical centerlines and said portion of said web offset from a plane including said centerlines.

16. A power panel arrangement for use in a space-divider wall panel system, comprising:
   a frame structure;
   oppositely facing panel covers supported on said frame structure;
   said frame structure comprising first and second vertically extending end plates and a web interconnecting said end plates and extending in a generally vertical direction, said frame structure defining inner spatial areas between said web and said covers for accommodating electrical outlet receptacles in said spatial areas; and
   said web comprising an enlarged section adjacent one surface of at least one of said end plates;
   said at least one of said end plates comprising a vertically extending groove in an other surface in register with said enlarged section, said groove adapted to receive threaded fasteners for securing attachment brackets to said other surface of said at least one of said end plates.

* * * * *